United States Patent [19]

Long

[11] Patent Number: 4,826,555

[45] Date of Patent: May 2, 1989

[54] METHOD AND APPARATUS FOR COMPRESSING A SELF-SUPPORTED WEB

[75] Inventor: Eliot R. Long, Arlington Heights, Ill.

[73] Assignee: Miply Equipment, Inc., Plymouth, Ind.

[21] Appl. No.: 74,000

[22] Filed: Jul. 16, 1987

Related U.S. Application Data

[62] Division of Ser. No. 834,616, Feb. 28, 1986, abandoned.

[51] Int. Cl.$^4$ .............................................. B32B 31/20
[52] U.S. Cl. ................................ 156/324; 156/583.5; 425/373
[58] Field of Search ............................ 156/324, 583.5; 198/493; 425/373

[56] References Cited

U.S. PATENT DOCUMENTS

| | | | |
|---|---|---|---|
| 2,812,542 | 11/1957 | Bleher ............................ | 425/373 X |
| 3,013,938 | 12/1961 | Justus et al. ...................... | 162/274 |
| 3,093,535 | 6/1963 | Brauns et al. ..................... | 162/274 |
| 3,556,939 | 1/1971 | Stenberg ......................... | 162/361 |
| 3,564,631 | 2/1971 | Burling .......................... | 8/156 |
| 3,616,660 | 11/1971 | Ingermarsson ..................... | 68/22 R |
| 3,808,092 | 4/1974 | Busker ........................... | 162/358 |
| 4,280,342 | 7/1981 | Fleissner . | |
| 4,457,683 | 7/1984 | Gerhardt et al. .................. | 425/373 |
| 4,576,682 | 3/1986 | Laapotti .......................... | 162/358 |
| 4,588,616 | 5/1986 | Menser . | |

FOREIGN PATENT DOCUMENTS

| | | |
|---|---|---|
| 1203374 | 4/1986 | Canada . |
| 0109520 | 5/1984 | European Pat. Off. . |
| 79919 | 2/1971 | German Democratic Rep. ................ 162/358 |

*Primary Examiner*—Robert A. Dawson
*Attorney, Agent, or Firm*—Willian Brinks Olds Hofer Gilson & Lione Ltd.

[57] ABSTRACT

An apparatus for processing a self-supporting web includes a rotatable mandrel and a stationary block member which defines a recess adjacent the mandrel. The recess is shaped to form a converging chamber between the mandrel and the block member, which converges in the direction of motion of the self-supporting web. A belt is mounted for movement through the chamber and is positioned between the self-supporting web and the block member. The chamber is sized to compress the self-supporting web between the block member and the mandrel, thereby reducing the thickness of the self-supporting web as it passes through the chamber. This apparatus can be used for laminating, liquid removal, or caliper reduction operations on the self-supporting web.

16 Claims, 2 Drawing Sheets

METHOD AND APPARATUS FOR COMPRESSING A SELF-SUPPORTED WEB

This is a continuation of application Ser. No. 06/834,616, filed Feb. 28, 1986 and now abandoned.

BACKGROUND OF THE INVENTION

This invention relates to devices and methods for compressing a self-supporting web, as for example to reduce the caliper of a web, to remove fluid from the web, or to laminate the web.

In the processing of self-supporting webs such as paper it is often necessary to compress the web. For example, calendar rolls may be used to reduce the thickness or caliper of a web and pinch rolls or nip rolls may be used to squeeze liquid out of the web. Pinch rolls have also been used to press two adjacent layers together to produce a laminate.

Such pinch or nip rolls are made up essentially of two opposed rolls which rotate in opposite directions and between which the self-supporting web to be processed is passed. Because both of the opposed rolls are cylindrical in cross-sectional shape, each portion of the self-supporting web is subjected to a short, high pressure spike as it moves between the rolls. Because the high pressure is applied to the web for only a relatively short time, it is not uncommon for a processing operation to require multiple calendar or nip rolls acting on the web in sequence.

In the past, pulp suspensions have been washed in devices including converging chambers. Ingermarsson, U.S. Pat. No. 3,616,660 and Burling, U.S. Pat. No. 3,564,631 describe two examples of such devices. In both cases a slurry of fibrous pulp and water is introduced into a converging chamber having porous walls. As the slurry moves through the chamber, the pulp remains in the chamber and a portion of the liquid in the pulp passes through the porous walls of the chamber. Once the liquid in the pulp has been removed, additional liquid is then used to wash the pulp. Though Ingermarsson and Burling employ converging chambers, neither is suitable for use with a self-supporting web. In both cases, conduits are used to supply the pulp bearing slurry to the processing apparatus.

Recently, a pressure saturator has been developed which employs a converging chamber to force a saturant into a substrate. This pressure saturator is described in U.S. Pat. No. 4,588,616, which is assigned to the assignee of this invention. As described in this patent application, the pressure saturator introduces the pressurized saturant into the substrate. This is quite a different operation from that contemplated by the present invention, which involves operations such as reduction of the caliper of the web, drying of the web, or lamination of a multilayer web.

SUMMARY OF THE INVENTION

This invention is directed to an improved apparatus for processing a self-supporting web. This apparatus is adapted for use in conjunction with means for supplying the self-supporting web to a processing station and means for withdrawing the self-supporting web from the processing station.

According to this invention, the processing station comprises first and second opposed members which define a converging chamber therebetween. The chamber defines an entry region and an exit region, and the depth of the chamber is greater in the entrance region than in the exit region. The first member is mounted stationarily in position with respect to a support surface, and a belt and means are provided for passing the belt through the chamber from the entrance region to the exit region adjacent the first member. In the processing station of this invention the self-supporting web is passed through the chamber from the entrance region to the exit region between the belt and the second member, and the chamber is sized to compress the self-supporting web between the first and second members, thereby reducing the thickness of the self-supporting web as it passes through the chamber. The belt is positioned to eliminate sliding contact between the self-supporting web and the first member.

Depending upon the construction and operation of the apparatus of this invention, it can be used to reduce the caliper of the self-supporting web, to dry the self-supporting web, or to laminate a multilayer self-supporting web. This invention is also directed to the thickness reduction, drying and laminating processes that can be practiced with the apparatus of this invention.

The present invention provides important advantages in operation. The converging chamber insures that a gradually increasing pressure is applied to the self-supporting web over a considerable time period. In the preferred embodiment described below which utilizes a mandrel, the converging chamber extends over more than 90° of the circumference of the mandrel. This is a significantly wider pressurized region than that characteristic of prior art nip or calendar rolls. Because pressure is applied to the self-supporting web for an increased time period as compared with conventional nip rolls, it is expected that many operations which previously required multiple nip rolls in succession can be accomplished with only a single device of the type described below. For this reason, it is anticipated that the present invention will provide important reductions in the capital cost and the operating cost of processing operations in which it is employed.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
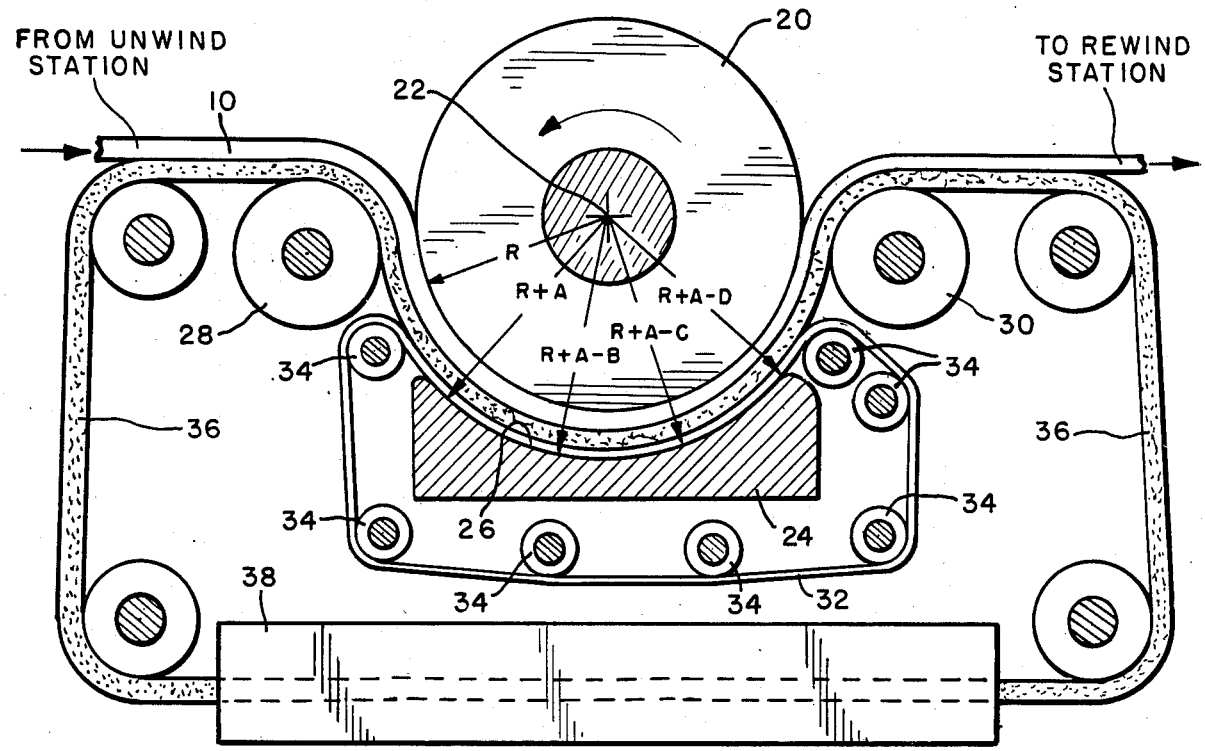
FIG. 1 is a partially schematic cross-sectional view of a first preferred embodiment of the apparatus of this invention.
Figure 2:
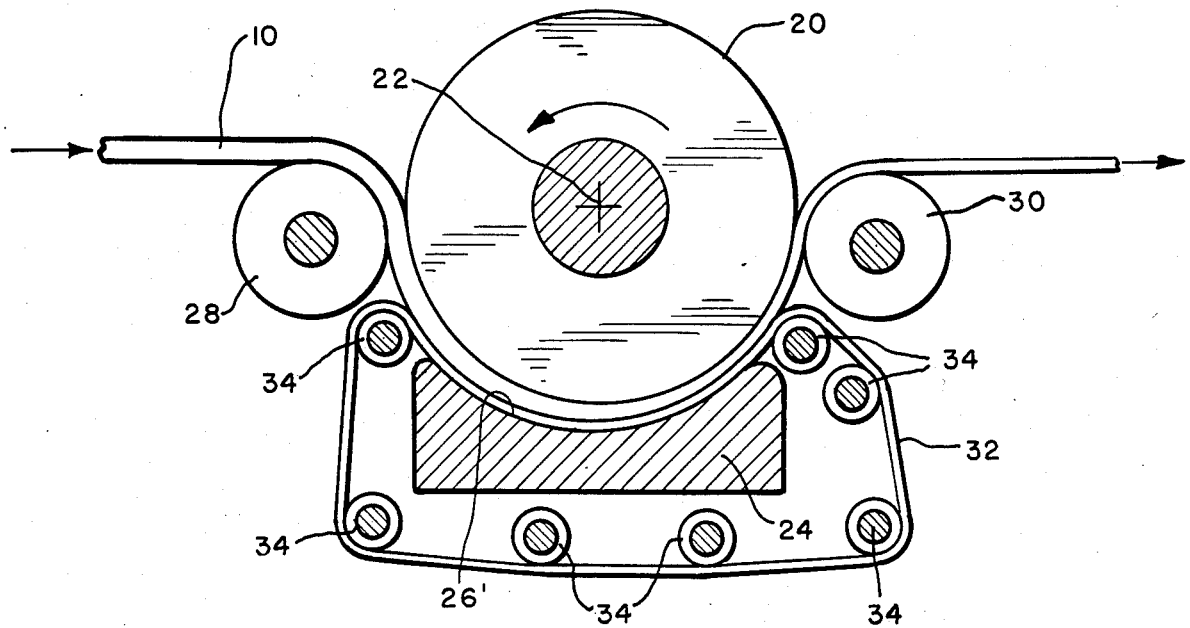
FIG. 2 is a view corresponding to FIG. 1 of a second preferred embodiment of this invention.
Figure 3:
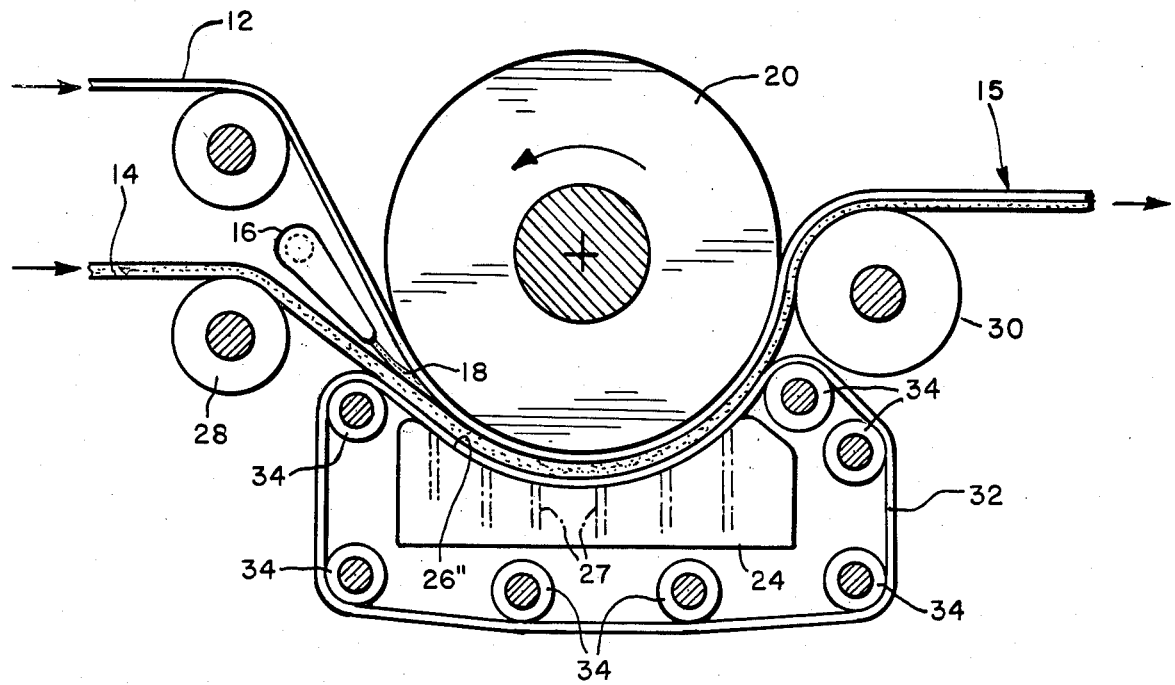
FIG. 3 is a view corresponding to FIG. 1 of a third preferred embodiment of this invention.

Turning now to the drawings, FIGS. 1 through 4 show somewhat schematic representations of four embodiments of the apparatus of this invention. The embodiments of FIGS. 1 through 3 are in many ways similar to one another, and the above-referenced U.S. patent application Ser. No. 06/661,913 provides considerable information on details of construction suitable for these embodiments. This document is hereby incorporated by reference for its discussion of such construction details.

The first preferred embodiment shown in FIG. 1 operates to dry an incoming self-supporting web 10. This embodiment includes a mandrel 20 which is mounted for rotation about an axis 22 in the direction shown by the arrow in FIG. 1. The mandrel 20 is mounted adjacent to a saddle block 24 which defines an arcuate recess 26 positioned adjacent to the mandrel 20 to receive a portion of the mandrel 20. Preferably the saddle block 24 is fixedly mounted during operation of the embodiment of FIG. 1, as for example by a frame. A converging chamber is defined between the saddle block 24 and the mandrel 20, and this converging chamber converges from an entrance region (at the left-hand side of the saddle block 24 as shown in FIG. 1) to an exit region (at the right-hand edge of the saddle block 24 as shown in FIG. 1). Thus, as any point on the periphery of the mandrel 20 rotates it moves through the chamber from the entrance region to the exit region. Preferably the surface of the mandrel 20 is smooth, cylindrical and solid, without perforations or grooves.

The embodiment of FIG. 1 also includes a pair of guide rollers 28, 30 which are mounted for rotation and are driven at a rate proportional to that of the mandrel 20 so that there is no slipage between the mandrel 20 on the one hand and the two guide rollers 28, 30 on the other hand.

A nonporous belt 32, which may for example be formed of a thin sheet of stainless steel, is arranged as an endless loop and is guided in its movement by idler rollers 34. The belt 32 is positioned immediately adjacent to the saddle block 24.

A porous belt 36 is mounted as shown in FIG. 1 to move through the converging chamber, guided and driven by the guide rollers 28, 30. The porous belt 36 is arranged as an endless loop, and a drier 38 is provided to remove moisture from the porous belt 36 after it leaves the exit region of the converging chamber and before it reenters the entrance region of the converging chamber.

The nonporous belt 32 is provided to reduce friction between the porous belt 36 and the saddle block 24, and the nonporous belt 32 is preferably free of perforations. Preferably, a suitable lubricant is provided on the underside of the nonporous belt 32, and the belt 32 protects the porous belt 36 from the lubricant. In alternate embodiments the lubricant can be introduced onto the underside of the nonporous belt 32 with an applicator (not shown) before the belt 32 makes contact with the saddle block 24, or alternately ports can be added in the saddle block 24 as shown at 27 in FIG. 3 to inject the lubricant against the underside of the belt 32 as it moves along the saddle block 24. Because the web 10 moves at the same linear speed as the surface of the mandrel 20, there is no need for a belt between the web 10 and the mandrel 20 to protect the web 10 from excessive frictional forces.

In operation, a self-supporting web 10 which carries a liquid to be removed is passed through the converging chamber, between the porous belt 36 and the mandrel 20. For example, the self-supporting web 10 may be supplied to the converging chamber by an unwind station and may be withdrawn from the converging chamber by a rewind station. The self-supporting web or substrate 10 can for example be a web of paper that has been previously wetted with a liquid to be removed. As the mandrel 20 and the guide rollers 28, 30 are rotated, the web 10 is moved through the converging chamber between the mandrel 20 and the saddle block 24. In this embodiment the mandrel 20 is a cylinder having a radius R and the arcuate recess 26 is shaped such that the depth of the chamber converges gradually and linearly from a value A near the entrance region to a value A - D near the exit region. Preferably, the value A is substantially equal to the original thickness of the web 10, the porous belt 36, and the nonporous belt 32. The distance A - D is equal to the thickness of the two belts 32, 36 plus the desired final thickness of the web 10. Preferably, the porous belt 36 is not compressed significantly as it passes through the converging chamber, and the web 10 is compressed from its initial thickness as it moves through the converging chamber. During this compression of the web 10, liquid in the web 10 is forced out of the web 10 into the porous belt 36. This liquid is then removed from the porous belt 36 by the drier 38.

The purpose of the drier 38 is to remove liquid from the porous belt 36 to allow continuous removal of liquid from the web 10. The present invention is not directed to any particular form for the drier 38, and those skilled in the art will recognize that a plurality of alternatives are available. For example, blowers, vacuum chambers, ovens, and other heaters may all be adapted to dry the porous belt 36.

FIG. 2 shows a schematic representation of a second preferred embodiment of this invention which is similar in many ways to the embodiment of FIG. 1. In the embodiment of FIG. 2, the porous belt 36 and the drier 38 have been eliminated. In addition, the arcuate recess 26' has been reshaped as necessary to provide the desired compression of the web 10; however the chamber defined between the recess 26' and the mandrel 20 converges in a gradual and progressive manner, similar to that described above in conjunction with the recess 26. As before, friction drives the nonporous belt 32 at the same linear speed as the web 10, thereby insuring that the friction of relative movement is concentrated between the nonporous belt 32 and the saddle block 24. The embodiment of FIG. 2 operates to reduce the caliper or thickness of the web 10. Preferably, the web 10 is substantially air-dry both before it enters the converging chamber and after it leaves the converging chamber in the embodiment of FIG. 2. If desired, the belt 32, the mandrel 20, the saddle block 24 may be heated in order to improve the operation of the embodiment of FIG. 2 in reducing the caliper of the web 10.

FIG. 3 shows yet another adaptation of the basic structure shown in FIG. 1. In the embodiment of FIG. 3 the self-supporting web is made up of two separate layers 12, 14. A delivery system 16 is provided for delivering a liquid adhesive 18 to the region between the two substrates 12, 14 prior to the entry of the substrates 12, 14 to the converging chamber between the mandrel 20 and the saddle block 24. The saddle block 24 is provided with an arcuate recess 26" which is shaped to provide a gradually converging chamber and therefore a gradually increasing compressive force which presses the two layers 12, 14 together to form a resulting laminate 15. Because pressure is exerted against the substrates 12, 14 for a considerable time as the substrates 12, 14 move through the converging chamber, excellent lamination results can be achieved.

Figure 4:
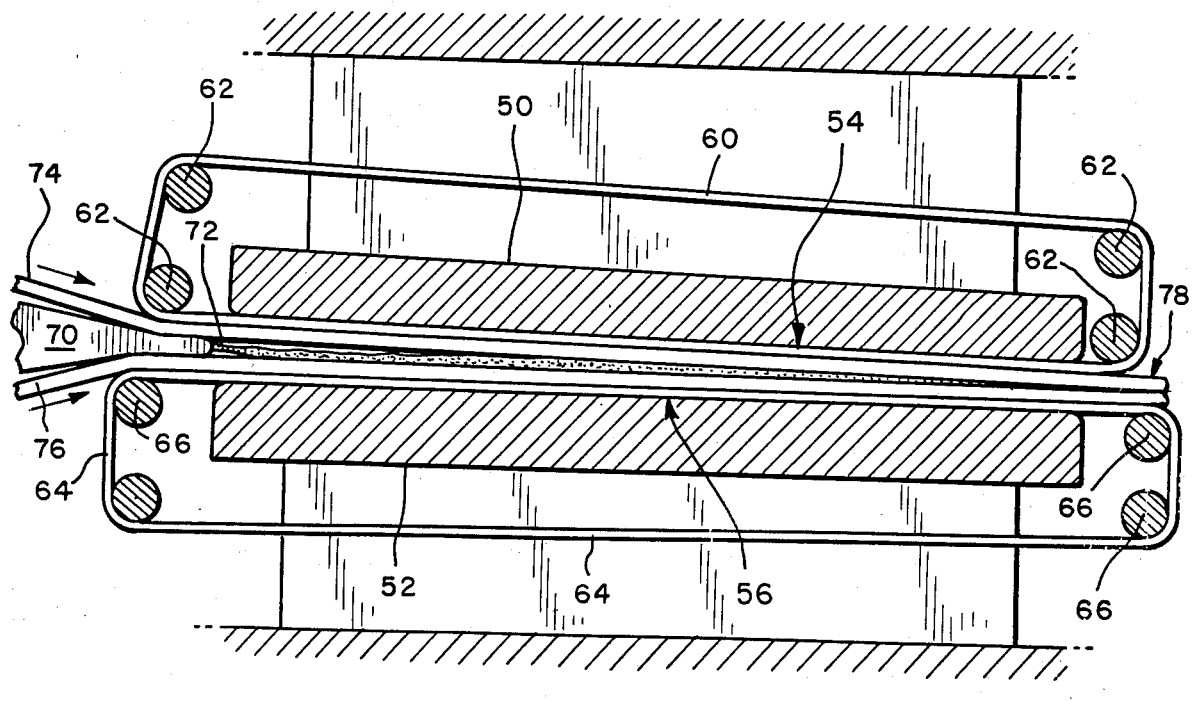
FIG. 4 is a partially schematic cross-sectional view of a fourth preferred embodiment of this invention.

FIG. 4 is a view of a fourth preferred embodiment which also laminates two substrates 74, 76 together to form a laminate 78. This fourth embodiment does not include a rotating mandrel, but rather utilizes two stationary blocks 50, 52 to define a converging chamber therebetween. This converging chamber gradually and progressively converges in depth from left to right as shown in FIG. 4. Each of the blocks 50, 52 is fixedly and rigidly mounted to a frame (not shown), and each block 50, 52 defines a respective face 54, 56 adjacent to the converging chamber. In this embodiment a first nonporous belt 60 moves via idler rollers 62 around the upper block 50, and a second nonporous belt 64 moves around the lower block 52 guided by idler rollers 66. These belts 60, 64 are similar to the nonporous belt 32, and can for example be formed of stainless steel.

In this embodiment the two substrates 74, 76 are introduced into the converging chamber between the blocks 50, 52 at the entrance region of the converging chamber (near the left-hand side of the blocks 50, 52 as shown in FIG. 4). An adhesive delivery system 70 is provided which delivers a liquid adhesive 72 to the region between the substrates 74, 76 shortly before the time the substrates 74, 76 enter the converging chamber. As the substrates 74, 76 are moved between the blocks 50, 52, the gradually reducing depth of the chamber between the blocks 50, 52 generates a gradually increasing compressive force tending to bond the substrates 74, 76 together to form a resulting laminate 78. The belts 60, 64 are preferably driven at the same linear speed as the substrates 74, 76 in order to insure that substantially all relative motion and friction associated with passage of the substrates 74, 76 between the blocks 50, 52 occurs between the belts 60, 64 and the blocks 50, 52, respectively. Of course, the two stationary blocks of the embodiment of FIG. 4 can be adapted for use in a caliper-reduction system or a fluid-removal system which operates according to the principals of the embodiments of FIGS. 1 and 2. If desired, either or both of the belts 60, 64 may be driven to move the substrates through the converging chamber.

The embodiments of FIGS. 1 through 4 provide important advantages in that the converging chambers subject the self-supporting webs to increasing pressures over a considerable period of time as the self-supporting webs move through the converging chambers. The dwell time of the self-supporting web in the high pressure zone created by the converging chamber is considerably greater than that of a web moving through a pair of conventional pinch rolls rotating at a comparable velocity. In the embodiments of FIGS. 1 and 2, the converging chamber has an effective depth at its entrance region substantially equal to the beginning thickness of the web, and the chamber gradually and progressively reduces the thickness of the web as it moves from the entrance region to the exit region.

Of course, it should be understood that a wide range of changes and modifications can be made to the preferred embodiments described above. For example, in some embodiments the liquid removing action of the porous belt 36 may be supplemented or replaced by drainage of liquid out of the converging chamber through openings or grooves in the surface of the mandrel 20 or the saddle block 24. It is therefore intended that the foregoing detailed description be regarded as illustrative rather than limiting, and that it be understood that it is the following claims, including all equivalents, which are intended to define the scope of this invention.

I claim:

1. In an apparatus for processing a plurality of self-supporting webs to form a laminate, said apparatus comprising means for supplying the self-supporting webs to a processing station and means for withdrawing the laminate from the processing station, the improvement wherein the processing station comprises:
    a rotatable mandrel;
    a recess defining member positioned adjacent the mandrel, said recess defining member cooperating with the mandrel to form a converging chamber therebetween, said chamber defining an entrance region and an exit region and having a greater radial depth in the entrance region than in the exit region;
    a belt;
    means for passing the belt through the chamber from the entrance region to the exit region;
    means fo supplying an adhesive between the self-supporting webs;
    means for passing the self-supporting webs through the chamber from the entrance region to the exit region between the mandrel and the belt;
    said chamber sized to compress the self-supporting webs between the recess defining member and the mandrel, thereby pressing the self-supporting webs together to form the laminate as the webs pass through the chamber;
    said belt positioned to eliminate sliding contact between one of the self-supporting webs and the recess defining member.

2. The invention of claim 1 wherein the mandrel defines an impermeable surface adjacent one of the self-supporting webs, and wherein the belt defines a nonperforated, impermeable surface adjacent another one of the self-supporting webs.

3. The invention of claim 2 wherein the adhesive comprises a liquid adhesive.

4. In an apparatus for processing a plurality of self-supporting webs to form a laminate, said apparatus comprising means for supplying the self-supporting webs to a processing station and means for withdrawing the laminate from the processing station, the improvement wherein the processing station comprises:
    first and second opposed members which define a converging chamber therebetween, said chamber defining an entrance region and an exit region and having a greater depth in the entrance region than in the exit region;
    means for mounting the first member stationarily in position with respect to a support surface;
    a belt;
    means for passing the belt through the chamber from the entrance region to the exit region adjacent the first member;
    means for passing the self-supporting webs through the chamber from the entrance region to the exit region between the belt and the second member;
    means for applying an adhesive between the self-supporting webs prior to entry of the webs into the chamber;
    said chamber sized to compress the self-supporting webs between the first and second members, thereby pressing the webs together to form the laminate as the webs pass through the chamber;
    said belt positioned to eliminate sliding contact between the self-supporting web and the first member.

5. The invention of claim 4 further comprising:
    means for mounting the second member stationarily in position with respect to the support surface;
    a second belt; and means for passing the second belt through the chamber from the entrance region to the exit region between the self-supporting web and the second member.

6. The invention of claim 4 wherein the belt defines a nonperforated, impermeable surface adjacent one of the self-supporting webs.

7. The invention of claim 6 wherein the adhesive comprises a liquid adhesive.

8. A method for reducing the caliper of a self-supporting web comprising the following steps:
(a) providing an apparatus comprising:
first and second opposed members which define a converging chamber therebetween, said chamber defining an entrance region and an exit region and having a greater depth in the entrance region than in the exit region; and
means for mounting the first member stationarily in position with respect to a support surface;
a belt; and
means for passing the belt through the chamber from the entrance region to the exit region adjacent the first member;
(b) passing the self-supporting web through the chamber from the entrance region to the exit region between the belt and the second member, said chamber sized to compress the self-supporting web, thereby reducing the caliper of the self-supporting web as it passes through the chamber.

9. The invention of claim 8 wherein the second member comprises a rotatable mandrel, and wherein the first member defines an arcuate recess sized to receive a portion of the mandrel to form the chamber.

10. The invention of claim 8 wherein the self-supporting web is substantially dry immediately prior to entry into the chamber and immediately after exit from the chamber.

11. The invention of claim 10 wherein the belt is solid and impermeable.

12. A method for laminating two self-supporting layers together to form a self-supporting laminate comprising the following steps:
(a) providing an apparatus comprising:
first and second opposed members which define a converging chamber therebetween, said chamber defining an entrance region and an exit region and having a greater depth in the entrance region than in the exit region; and
means for mounting the first member stationarily in position with respect to a support surface;
(b) providing an adhesive between the two self-supporting layers; and
(c) passing the two self-supporting layers through the chamber from the entrance region to the exit region between the first and second members, said chamber sized to compress the two self-supporting layers together gradually and progressively, thereby causing the adhesive to bond the two self-supporting layers together to form the self-supporting laminate.

13. The invention of claim 12 wherein the second member comprises a rotatable mandrel, and wherein the first member defines an arcuate recess sized to receive a portion of the mandrel to form the chamber.

14. The invention to claim 12 wherein the self-supporting web is substantially dry immediately prior to entry into the chamber and immediately after exit from the chamber.

15. The invention of claim 12
wherein the apparatus further comprises:
a belt; and
means for passing the belt through the chamber from the entrance region to the exit region adjacent the first member; and
wherein the two self-supporting layers are passed through the chamber between the belt and the second chamber.

16. The invention of claim 15 wherein the belt is solid and impermeable.

* * * * *